(No Model.) 11 Sheets—Sheet 1.

J. J. WOLF & N. G. ROSS.
BOX STRAP MACHINE.

No. 584,975. Patented June 22, 1897.

Witnesses:
G. Y. Thorpe.
M. P. Remley.

Inventors,
N. G. Ross and
J. J. Wolf.
by Higdon & Higdon
Attys.

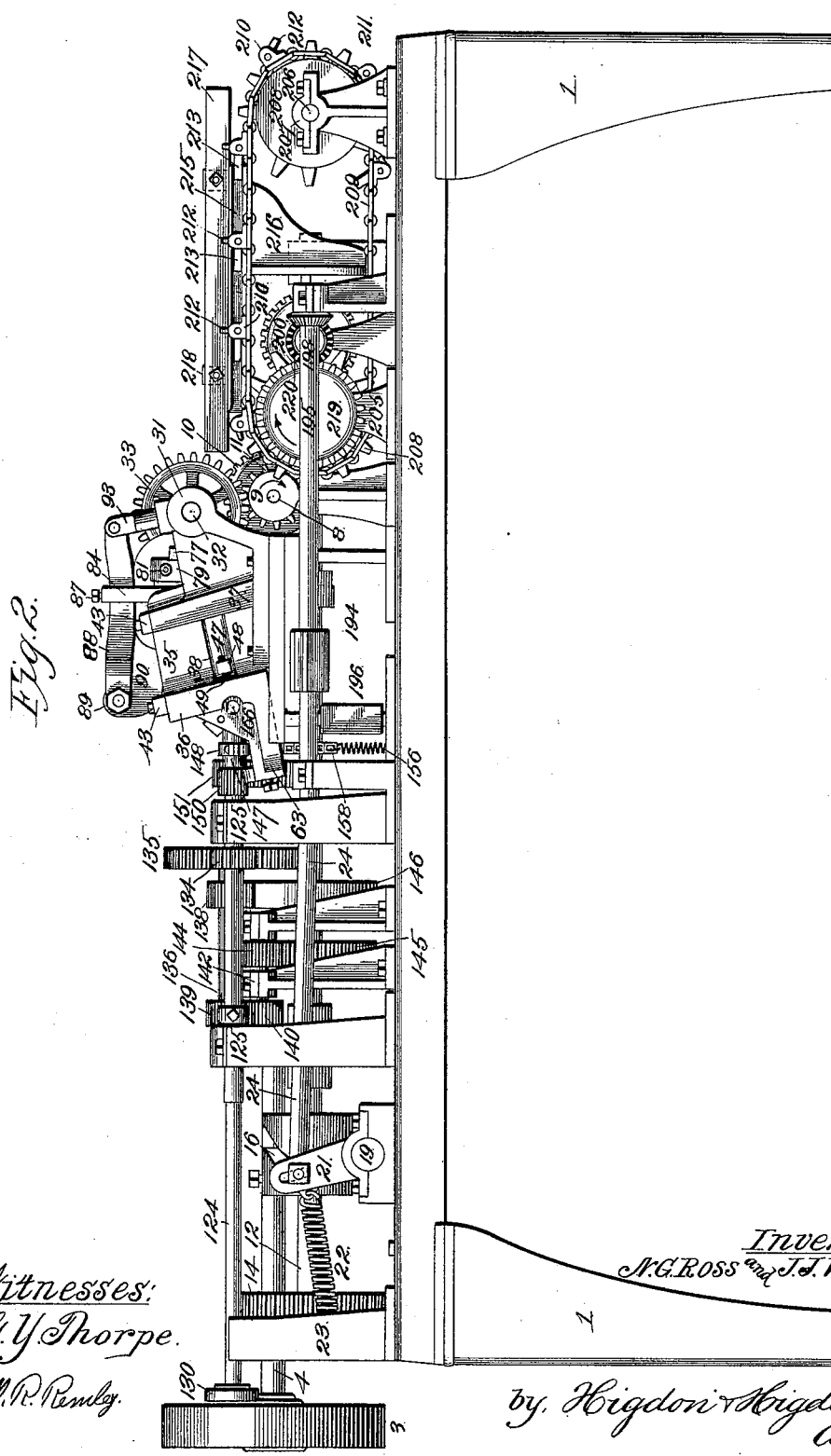

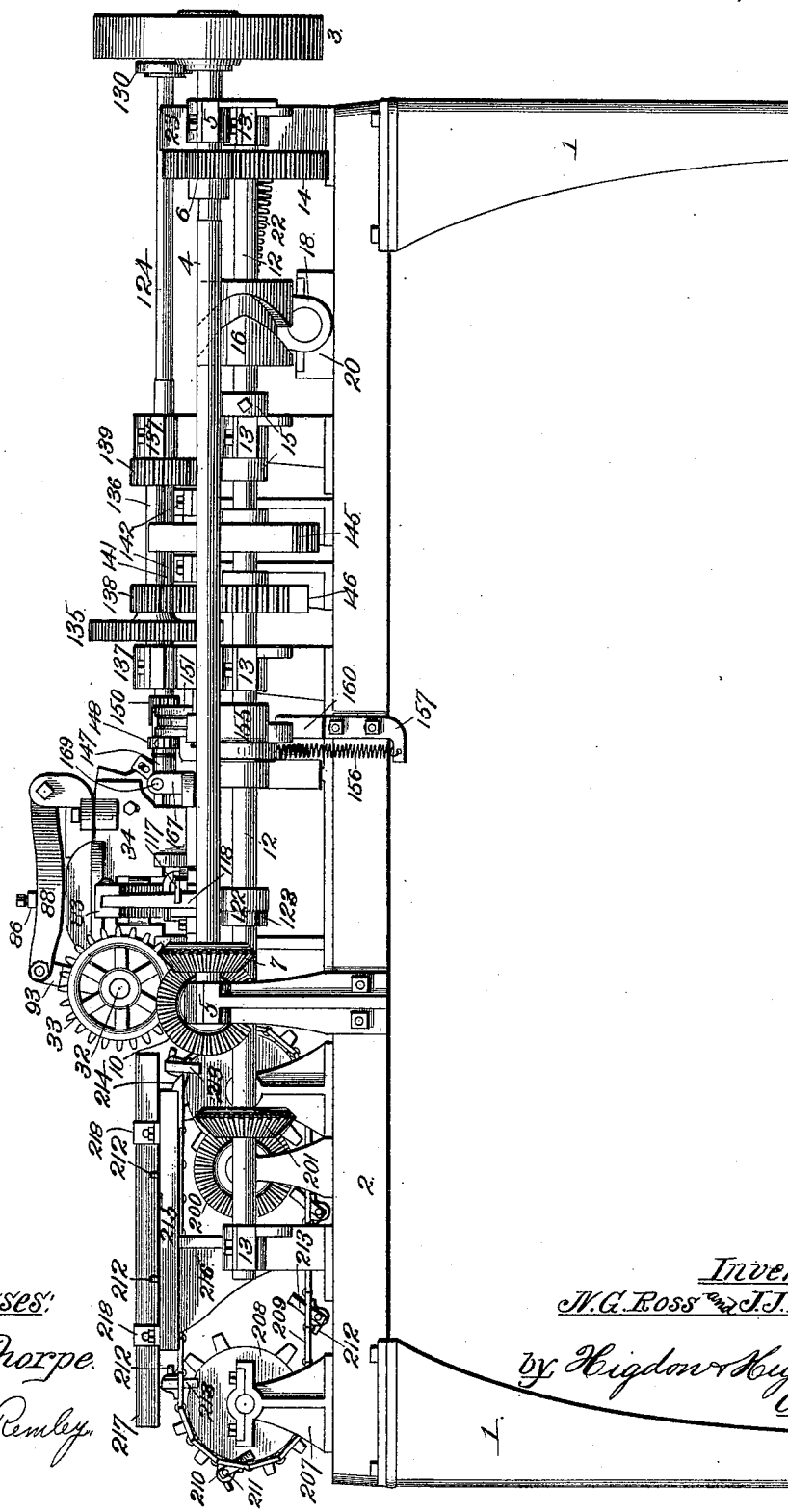

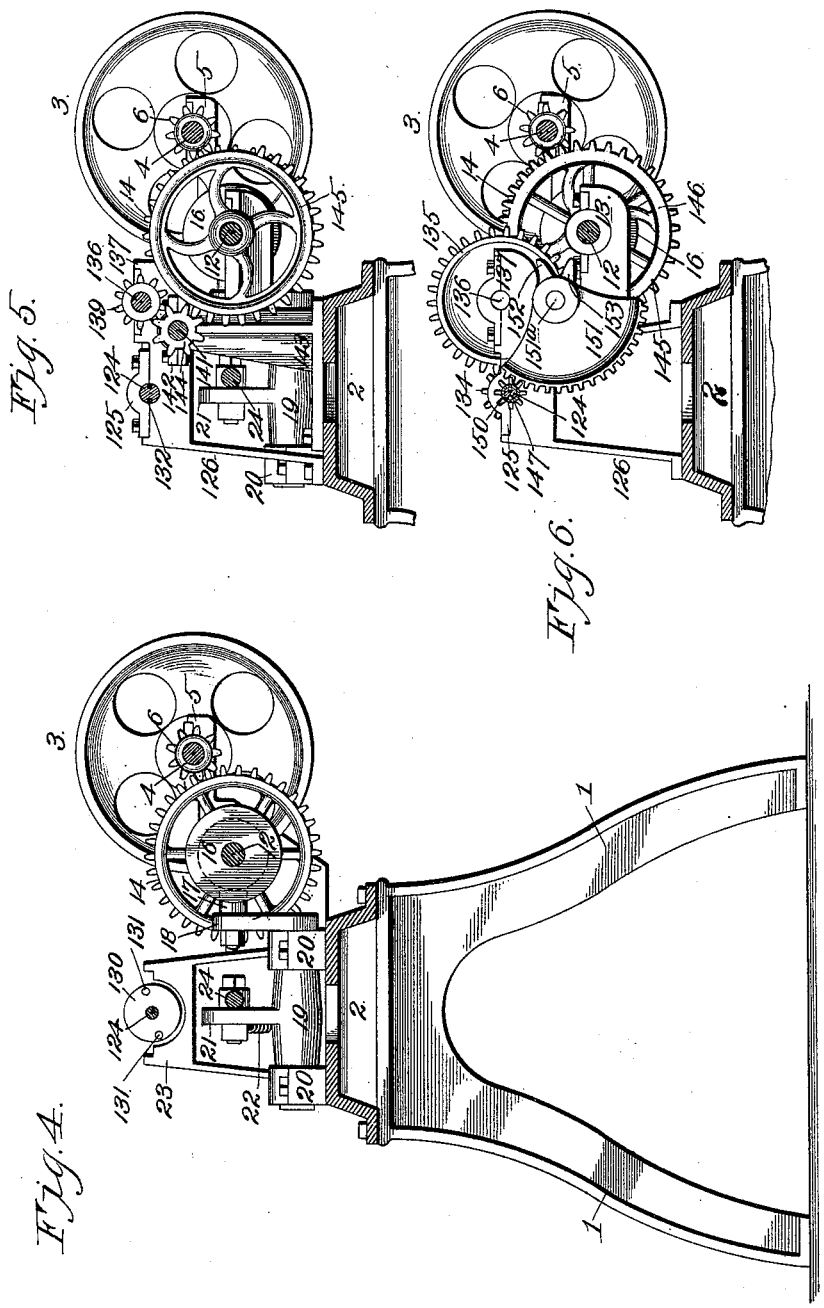

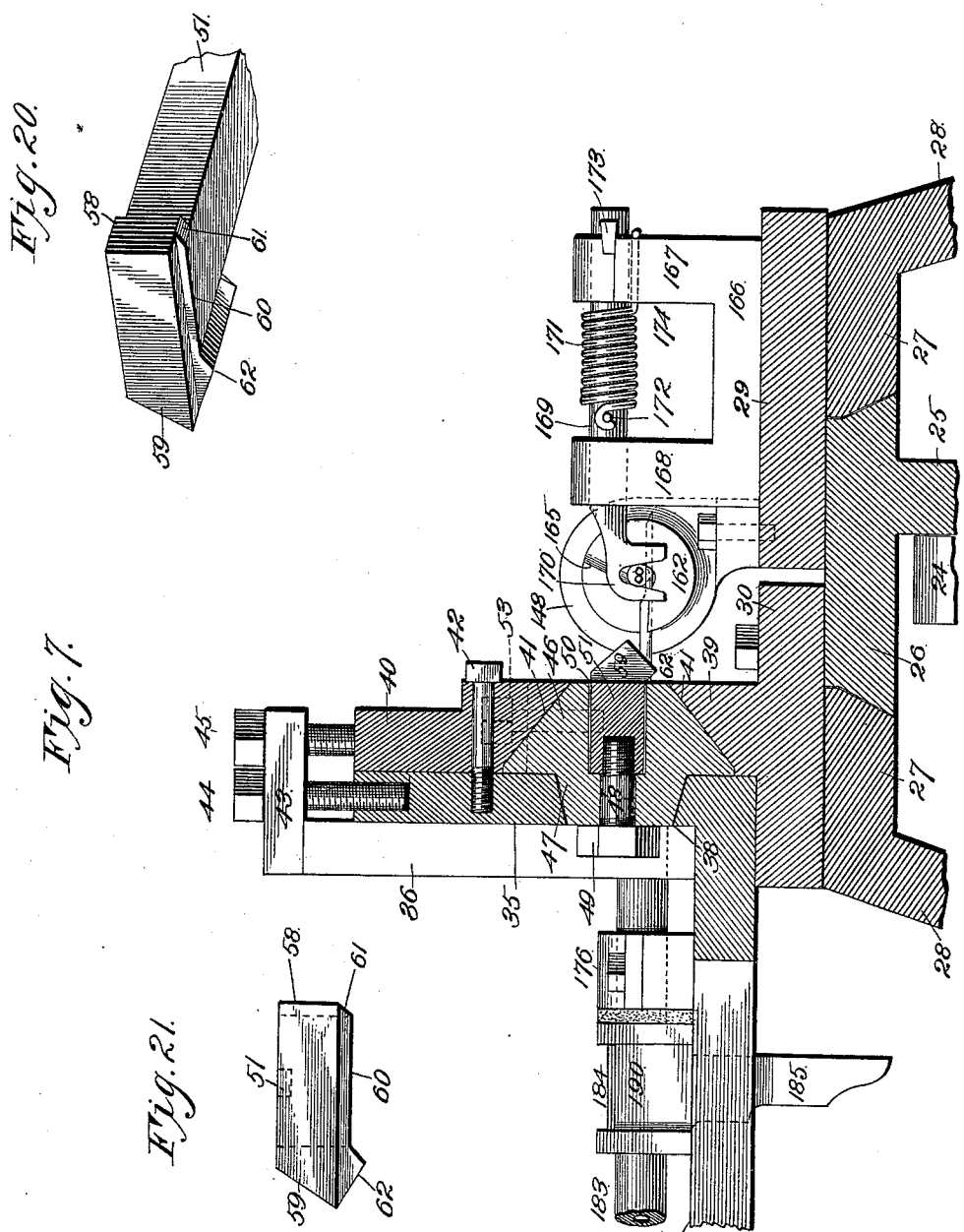

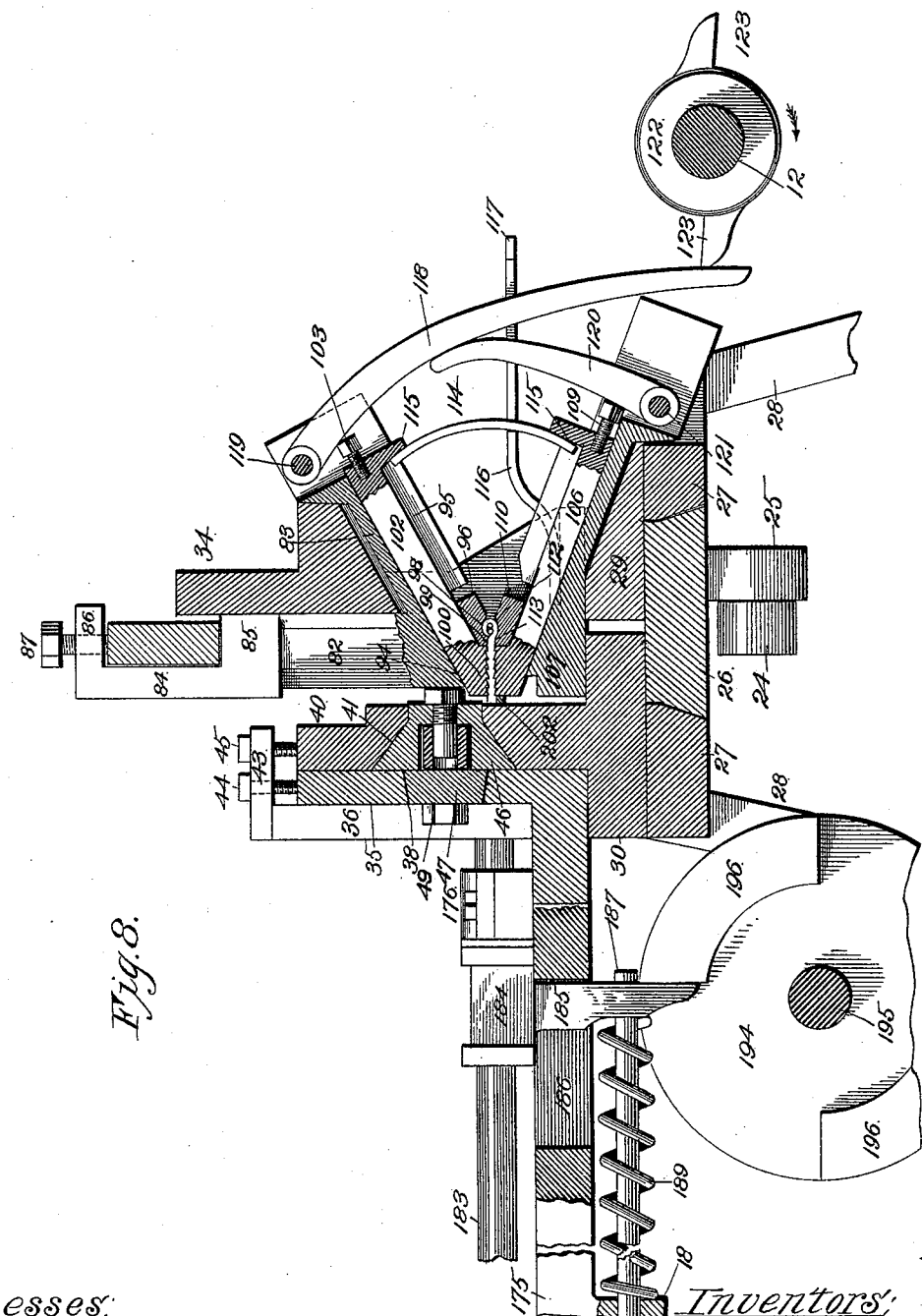

(No Model.) 11 Sheets—Sheet 7.
J. J. WOLF & N. G. ROSS.
BOX STRAP MACHINE.
No. 584,975. Patented June 22, 1897.

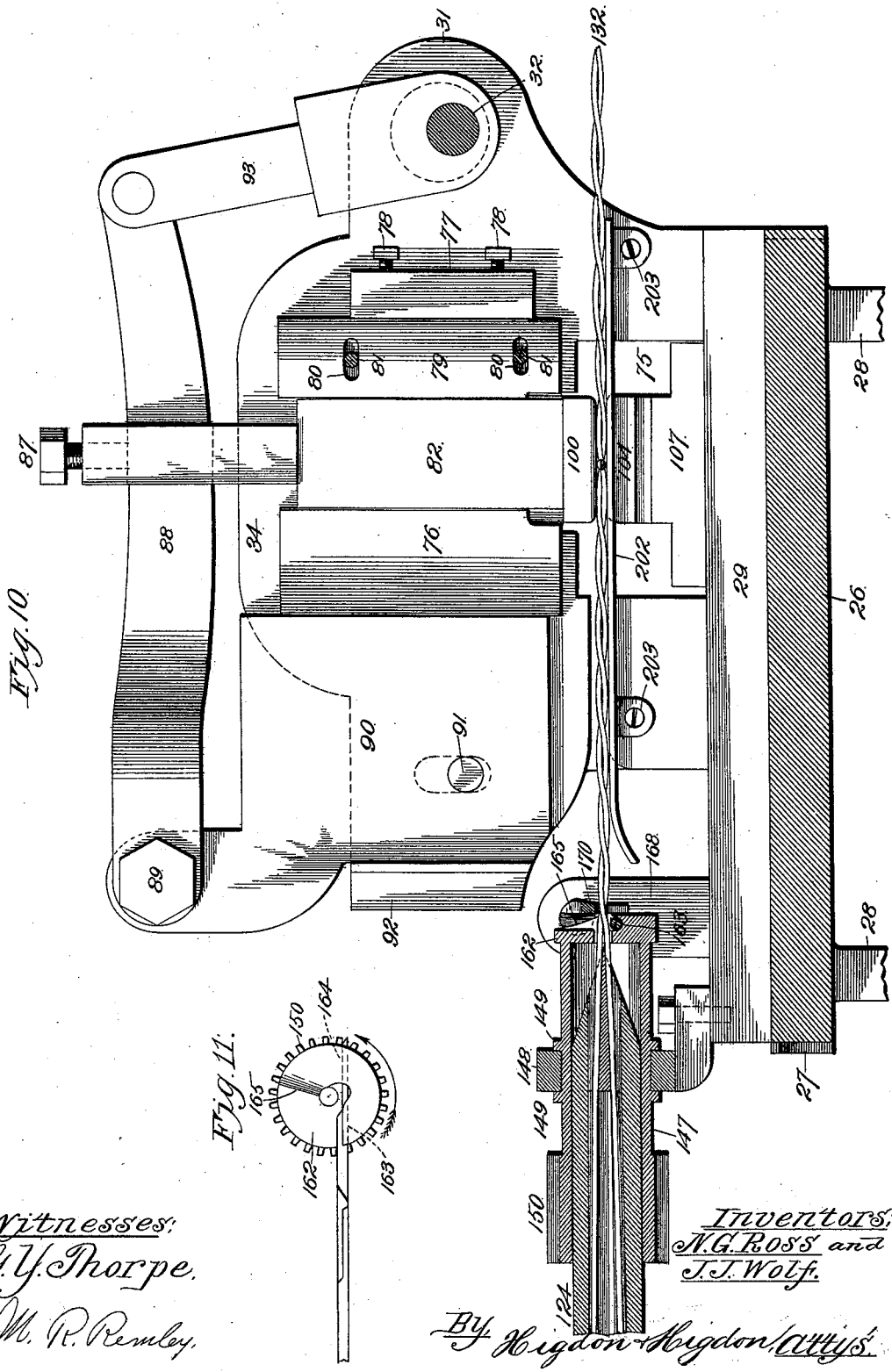

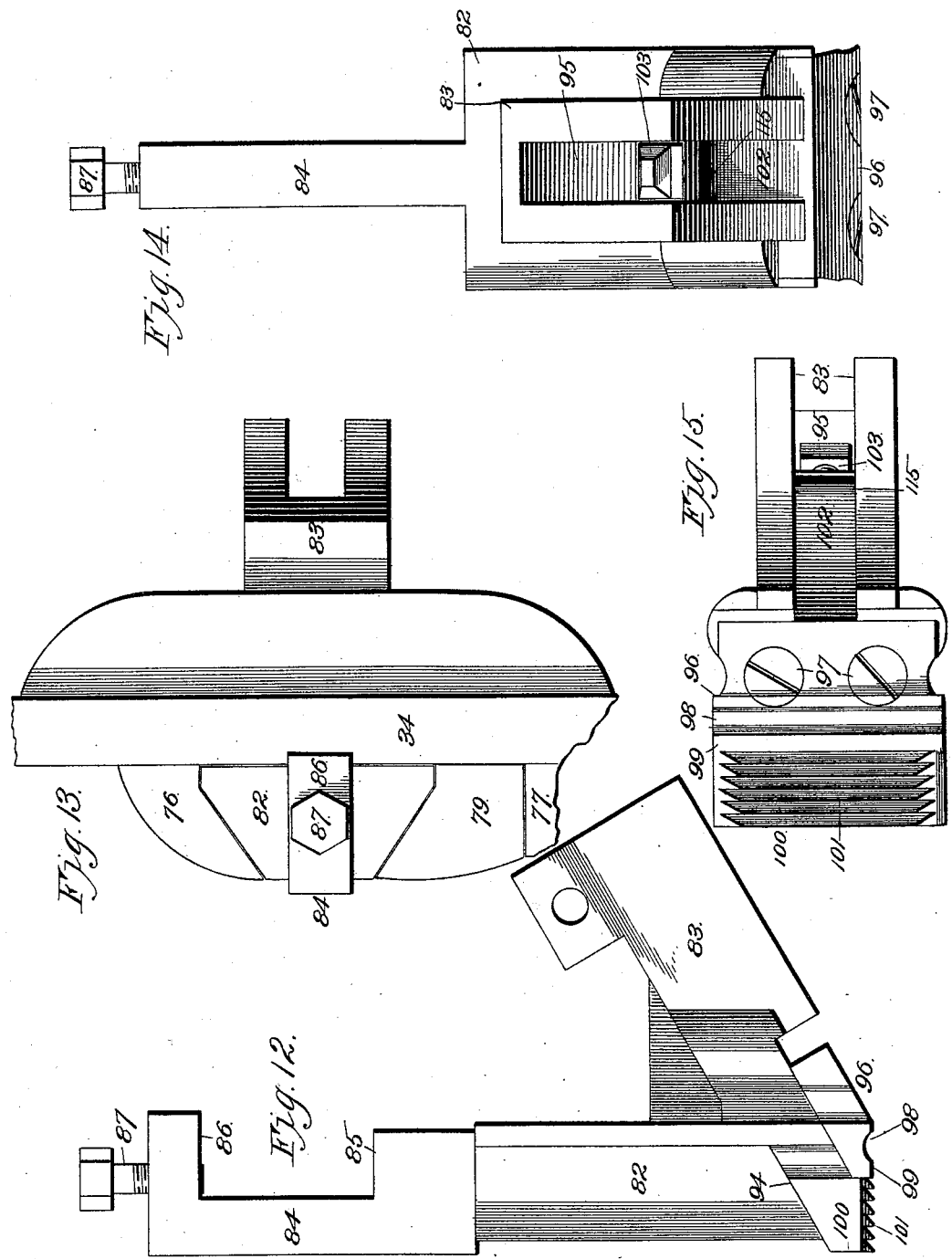

(No Model.)  11 Sheets—Sheet 10.
J. J. WOLF & N. G. ROSS.
BOX STRAP MACHINE.
No. 584,975. Patented June 22, 1897.
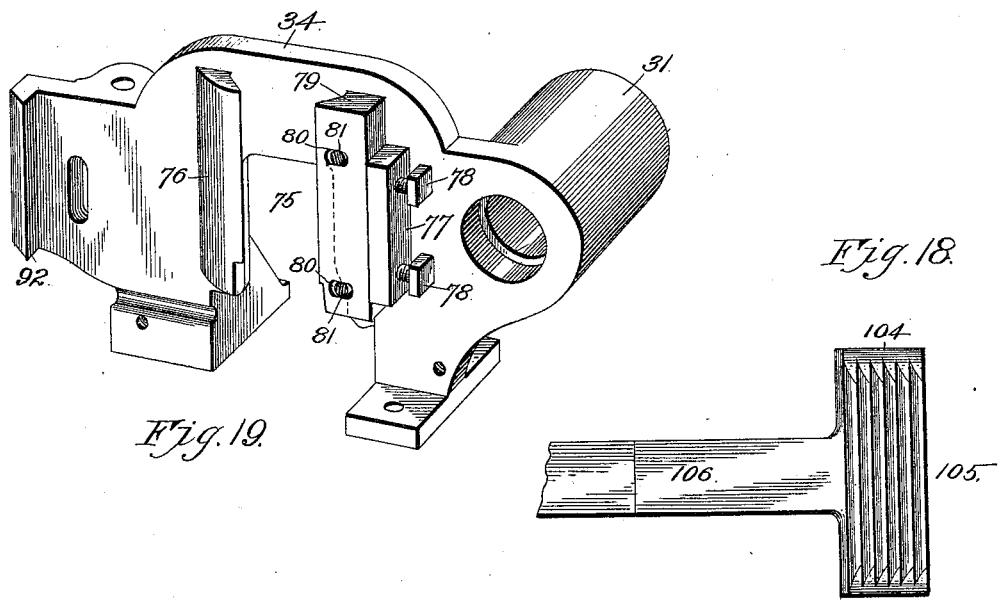
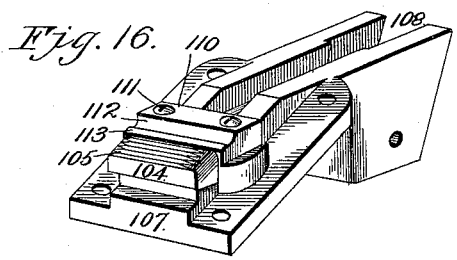
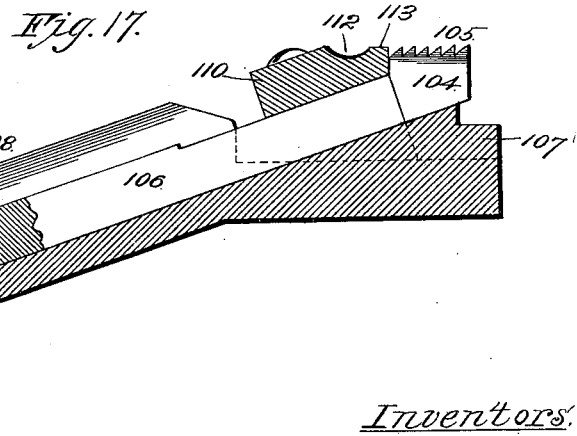
Witnesses:
Inventors:
N. G. Ross and J. J. Wolf
By Higdon & Higdon
Attys.

(No Model.)
11 Sheets—Sheet 11.
J. J. WOLF & N. G. ROSS.
BOX STRAP MACHINE.
No. 584,975.
Patented June 22, 1897.
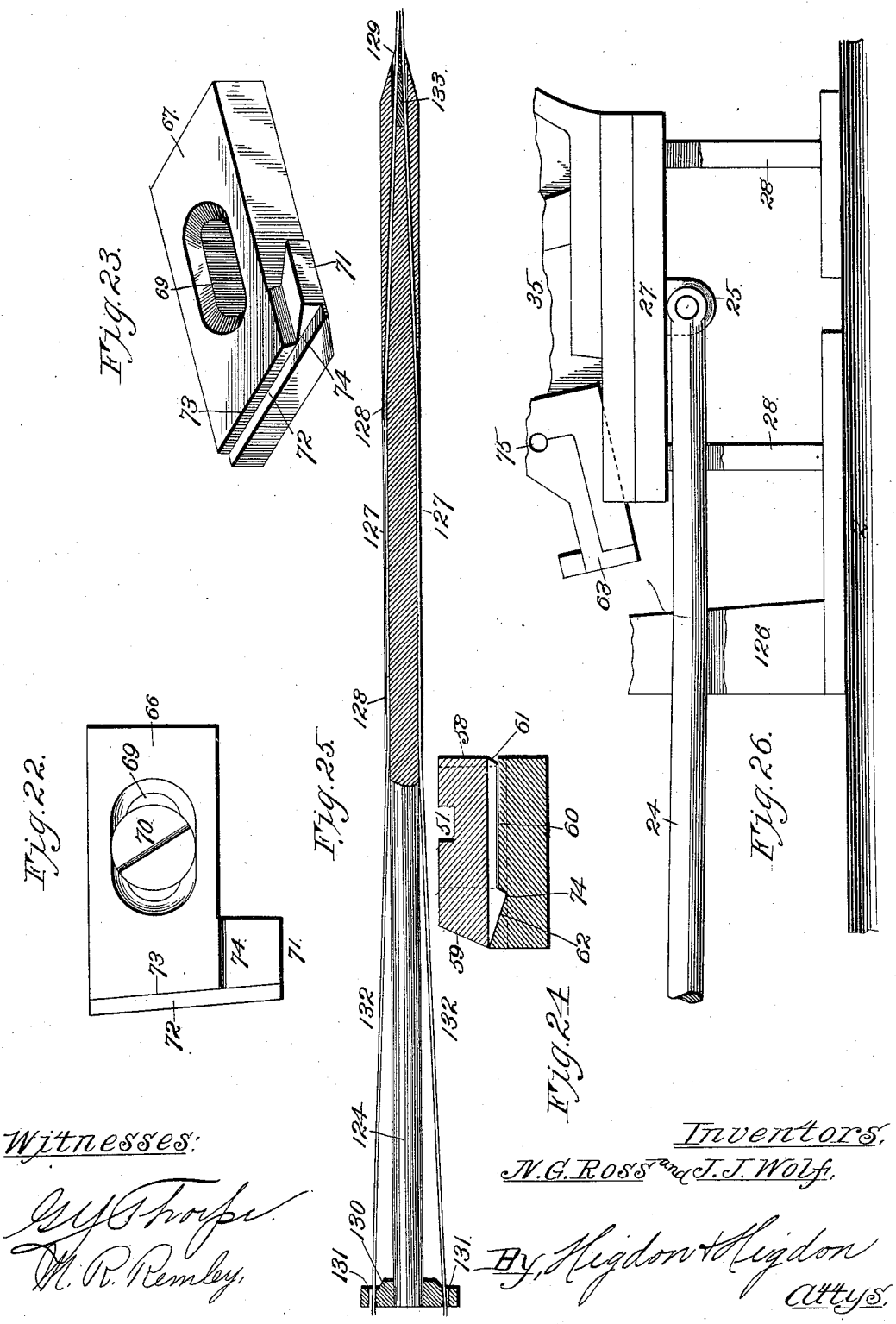
Witnesses:
G. Y. Thorpe
N. R. Remley
Inventors,
N. G. Ross and J. J. Wolf,
By Higdon & Higdon
Attys

UNITED STATES PATENT OFFICE.

JULIUS J. WOLF AND NOBLE G. ROSS, OF KANSAS CITY, MISSOURI, ASSIGNORS TO THE WOLF SAFETY BOX-STRAP COMPANY, OF SAME PLACE.

BOX-STRAP MACHINE.

SPECIFICATION forming part of Letters Patent No. 584,975, dated June 22, 1897.

Application filed October 8, 1896. Serial No. 608,297. (No model.)

*To all whom it may concern:*

Be it known that we, JULIUS J. WOLF and NOBLE G. ROSS, of Kansas City, Jackson county, Missouri, have invented certain new and useful Improvements in Box-Strap Machines, of which the following is a full, clear, and exact description, reference being had to the accompanying drawings, forming a part thereof.

Our invention relates to machines for manufacturing flexible metallic box-straps; and it consists in certain novel and peculiar features of construction and combinations of parts which will be hereinafter described and claimed.

The object of the invention is to produce a machine of this character which will automatically and positively and reliably form a flexible cable and string nails thereon securely at regular intervals and with their shanks projecting rigidly in the same direction, and which will also beard or barb said nails in order to render difficult their withdrawal from the boards, crates, barrels, &c., into which they are driven, and consequently insure that such boxes, &c., when once secured will remain in such condition until the nails are wrenched or pried out by a suitable instrument.

In order that the invention may be fully understood, we will proceed to describe it with reference to the accompanying drawings, in which—

Figure 1:
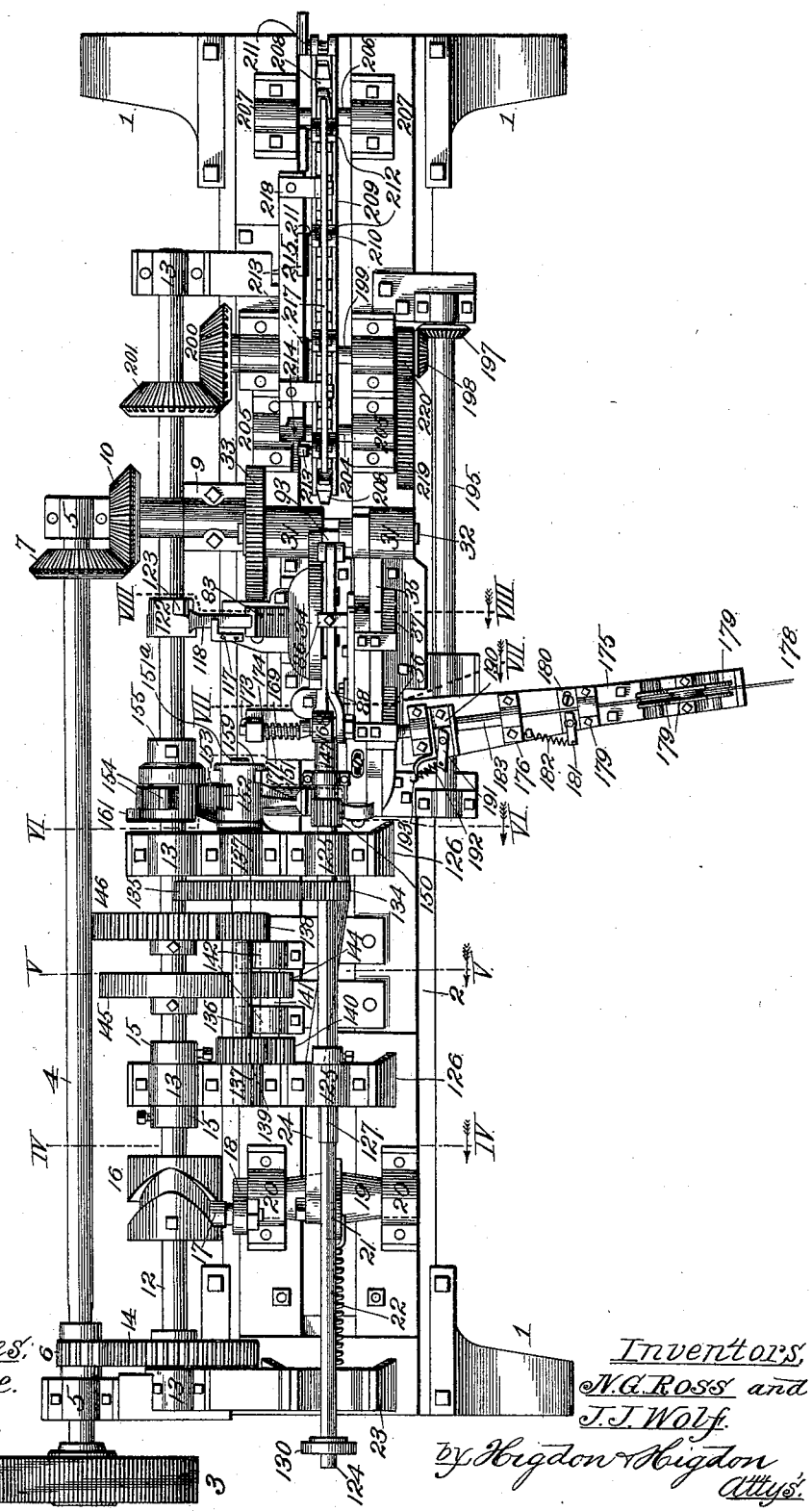
Figure 9:
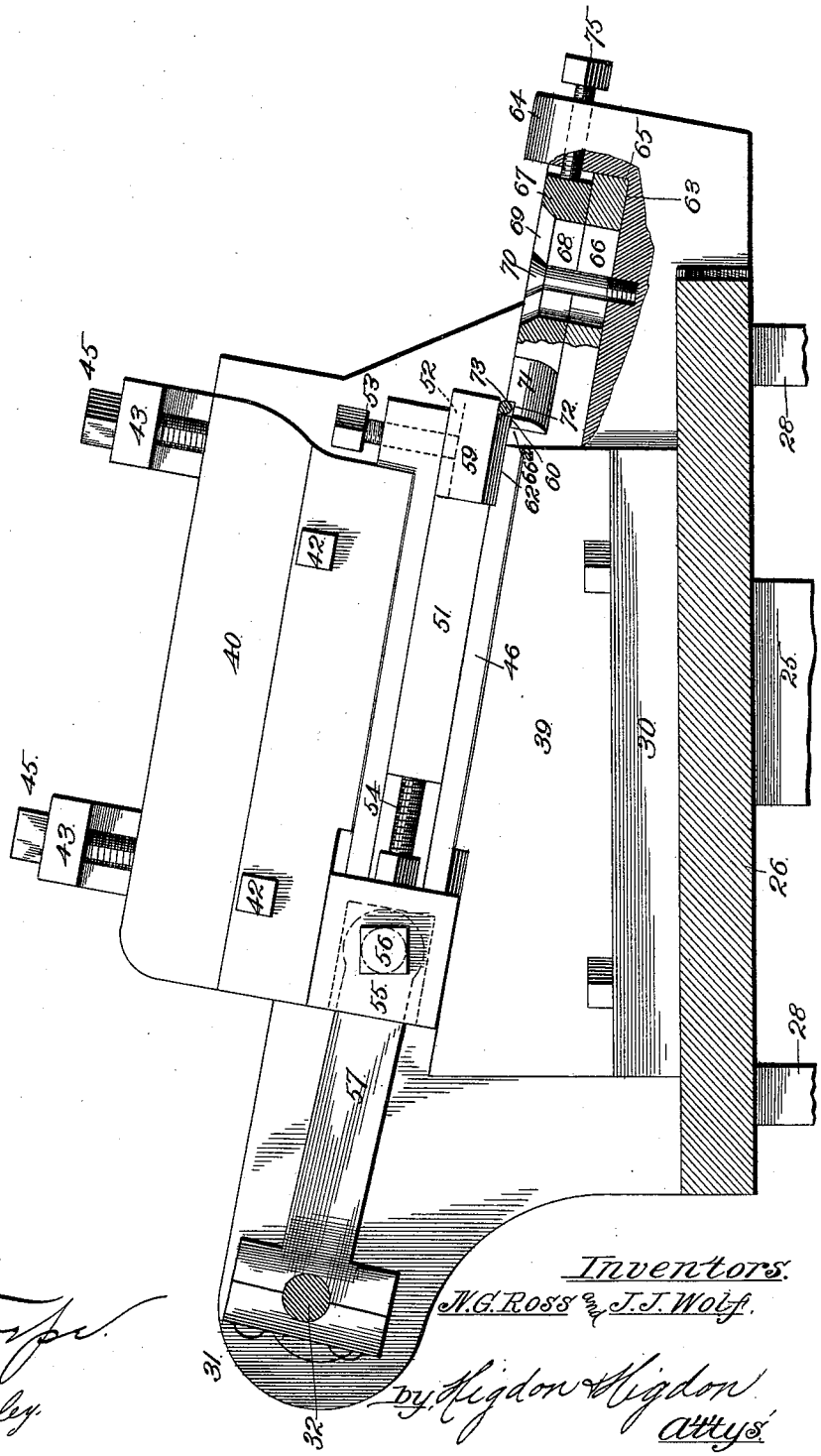

Figure 1 represents a top plan view of a machine constructed in accordance with our invention. Fig. 2 represents a side elevation of the same with the nail-wire-feeding-mechanism omitted. Fig. 3 is a view of the opposite side of the machine. Fig. 4 is a cross-section taken on the line IV IV of Fig. 1. Fig. 5 is a cross-section taken on the line V V of Fig. 1. Fig. 6 is a cross-section taken on the line VI VI of Fig. 1. Fig. 7 is a cross-section, on a greatly-enlarged scale, taken on the line VII VII of Fig. 1. Fig. 8 is a cross-section, also on a greatly-enlarged scale, taken on the line VIII VIII of Fig. 1. Fig. 9 is a vertical longitudinal section of the sliding carrier and discloses the mechanism for splitting the nail-wire. Fig. 10 is a vertical longitudinal section on the same scale as Fig. 9 and discloses clearly the mechanism for barbing or bearding the nails and for twisting the cable and the nails upon said cable. Fig. 11 is an end view of the mechanism for twisting or coiling the nail upon the cable. Figs. 12, 13, 14, 15, 16, 17, and 18 are detailed views, about full size, of the mechanism for barbing or bearding the nails. Fig. 19 is a perspective view of the stand-plate or casting through and by which the barbing or bearding knife carriers extend. Figs. 20, 21, 22, 23, and 24 represent views of the nail-forming knives. Fig. 25 is a view, partly in side elevation and partly in longitudinal section, of the wire-twisting shaft. Fig. 26 is a side elevation of a part of the machine and discloses the push-and-pull rod by which the carrier is reciprocated.

Referring now to the drawings, wherein like numerals designate corresponding parts, 1 designates the legs, and 2 the bed-frame, of our machine.

3 designates the drive-pulley, which is mounted rigidly on one end of the longitudinal drive-shaft 4, journaled at or near its opposite ends in bearings 5 of or secured to the bed-frame. Near its front end it carries rigidly a spur gear or pinion 6 and near its opposite end a bevel-gear 7. Arranged opposite the rear end of said shaft in the same horizontal plane and extending at right angles thereto is a short shaft 8, journaled in a bearing or standard 9, mounted upon the bed-frame. At one end said shaft carries rigidly a beveled gear 10, meshing with the beveled gear 7, and at the opposite end a spur gear or pinion 11.

12 designates a longitudinal shaft interposed between the shaft 4 and the bed-frame. It occupies a lower plane than said shaft in order that it may pass freely beneath the shaft 8, and is journaled in bearings 13, supported upon and extending laterally from the bed-frame. Mounted rigidly upon said shaft at its front end is a spur-gear 14, meshing with the pinion 6, and said shaft is prevented from moving longitudinally by means of the collars 15 at opposite sides of one of its bearings 13.

16 designates a double-groove cam mounted rigidly upon shaft 12 near its front end and engaging the antifriction-roller 17, carried by crank-shaft 18 of the transverse rock-shaft 19, which shaft is journaled in bearings 20 upon the bed-frame and extends at right angles to the shaft 12. Said rock-shaft is provided with a crank-arm 21 at its middle, and a retractile spring 22 connects the upper end of said arm with the standard 23, cast with or secured upon the bed-frame at its front end. Said arm is also pivotally connected with the front end of a push-and-pull rod 24. Said rod is pivotally connected at its rear end to the depending lug 25 of the sliding bed-plate 26 of a carrier, to be presently described. Said bed-plate is dovetailed in the stationary supporting and guide frame 27, provided with depending legs 28, which are bolted or otherwise rigidly secured upon the bed-frame of the machine.

29 and 30 designate plates which may be cast integrally with or secured upon the bed-plate, as preferred. They project, however, beyond the side margins of the bed-plate 26, and rest upon the horizontal guide and supporting frame 27.

31 designates a pair of oppositely-disposed bearings in which is journaled the horizontal transverse crank-shaft 32, and mounted upon one end of the same is a spur-gear 33, meshing with and driven continuously by the pinion 11. The bearing at the right-hand side, when looking toward the front end of the machine, is integrally formed, preferably, with the stand-plate 34, cast with or secured upon the plate 29 of the carrier. The opposite bearing 31 is preferably cast integral with a longitudinal stand-plate 35, which stand-plate may be cast integral with or secured upon the plate 30. Said plate 35 is provided with two inclined ribs 36 and 37 and with a slot 38, which extends radially of the axis of the shaft 32 and inclines downwardly and forwardly, as shown clearly in Fig. 2. Arranged at the inner side of said stand-plate are two plates 39 and 40. The plate 39 is shown in Fig. 7 as integrally formed with the plate 30, but may be secured to said plate or to the stand-plate 35, if desired. The plate 40 is secured to said stand-plate by means of the bolts 42. The opposing edges of said plates are beveled, as shown at 41, and the plates are arranged so as to provide a passage, the opposing walls of which converge inwardly and which extends radially of the axis of the shaft 32, as clearly shown in Fig. 9. This relation of said plates is secured by means of the pair of plates 43 upon the upper ends of the ribs 36 and 37, and the clamping-bolts 44 and 45, which extend through said plates into and upon, respectively, the plate 35 and the plate 40.

46 designates a reciprocatory knife-carrier which is dovetailed in the passage formed by and between the plates 39 and 40, and 47 designates a longitudinal rib of the same, which fits in the longitudinal slot 38 of the plate 35. Said knife-carrier is provided with a longitudinal slot 50, in which is rigidly but adjustably mounted the knife 51.

The knife is secured in position by means of a clamping screw-bolt 48, which extends through a longitudinal slot 49 in the rib of the knife-carrier. By loosening said bolt the knife can be adjusted longitudinally and then secured at the required point by the proper operation of the clamping-bolt. Said knife is provided at its front end with a longitudinal slot 52, engaged in the lower end of the guide-bolt 53, carried by the knife-frame, as shown clearly in Fig. 9. The knife is made longitudinally adjustable by means of said screw 54, which bears at its head end against the enlargement 55 of the knife-carrier. Said enlargement is hollowed out, as shown in dotted lines in Fig. 9, and extending through said chamber or cavity is the pivot-bolt 56, upon which the front end of the pitman 57 is journaled, the rear end of said pitman being journaled upon the crank or eccentrically-disposed arm of the shaft 32, so that with each revolution of said shaft the knife-carrier and the knife will alternately advance and recede for a purpose which will hereinafter appear.

The knife 51 at its front end is laterally widened, as shown at 85 at one side and as shown at 59 at the opposite side, said enlargement 59 being of greater length vertically than the enlargement 58 and depending also below the plane of the body of the knife. The front and lower edge of the knife, preferably at an angle slightly acute to its longitudinal disposition, is grooved, as shown, so as to produce a cutting edge and an overhanging shoulder. The horizontal portion of the cutting edge 60 is in the plane and of equal length to the width of the body of the knife. At one end said cutting edge extends upwardly and outwardly to produce the inclined cutting-surface 61, extending at an obtuse angle to the body portion, while at the other end said cutting edge is approximately V-shaped, as shown at 62, the apex of said V-shaped edge occupying the plane of the lower side of the nail-wire which is to be cut, while the upper end of the inclined cutting-surface 61 occupies the plane of said overhanging shoulder and of the upper side of said wire.

The stand-plate 35 at its front end is provided with a recess 63 and with an upwardly-projecting lug 64 at the front end of said recess, and fitting snugly in said recess is a bar 65, provided with a longitudinal slot 66, and mounted adjustably upon said bar and within said recess is the lower or stationary knife 67, the upper surface of which is slightly below the plane of the lower surface of the reciprocating knife. Said knife 67 is provided with a longitudinal slot 68, and the knife marginally of said slot is countersunk, as shown at 69, to receive the head of the screw-bolt 70, by which said knife is clamped at the desired point of adjustment. As the knife is resharpened its thickness is gradually diminished, and as it is necessary that its cutting edge or upper surface be always in the same plane the bar 65 is arranged to support it, said bar of course being detachable in order that as the knife is ground down it may be replaced by a similar bar of increased thickness sufficient to compensate for the reduced thickness of the knife. Said plate also has an arm 66ª at its front end to form a backing to prevent the withdrawal of the reciprocatory knife drawing the nail back with it. At its front end said knife is widened at one side, as shown at 71, and is grooved, as shown at 72, so that when the upper or reciprocating knife is about to split the nail-wire its corresponding or opposing recess forms the upper and rear sides of a rectangular or square passage, in which the wire is securely held while being operated upon, as shown clearly in Fig. 9. The cutting edge 73 of said lower knife is provided with a V-shaped notch 74 at one end to correspond with and receive the V-shaped cutting edge of the upper knife in order that the nail previously formed shall be severed from the body of the wire at the same time that the latter is reduced in thickness by being split for a suitable distance by the horizontal cutting edges 60 and 73 of the knives. It will be observed by referring particularly to Fig. 24 that the vertical distance between the apex of said V-shaped cutting edges and their highest points is equal to or slightly exceeds the thickness of the nail-wire in order that this cutting edge or surface will sever the advanced portion of the wire from the body portion, and it will also be noted that the portion lying above the plane of the cutting edges 60 and 73 is severed completely from the body of the wire by reason of the fact that the beveled cutting edge 61 extends from one end of said horizontal cutting edges 60 and 73 to the upper edge of the wire, so as to leave the body of the wire provided with a reduced extension represented by that portion lying between the horizontal cutting edges of said knives, the bottom of the recess 72 of the lower cutting-knife, and the V-shaped cutting edges of said knives, as will be readily understood.

The plate 34 is provided at opposite sides of an opening 75 therein with the guide-rib 76 and the lug 77, provided with set-screws 78, whereby the guide-block 79 may be adjusted toward or from said guide-rib 76. Said block is provided with a pair of slots 80, through which extend the supporting-screws 81.

82 designates a slide-frame which is arranged vertically and dovetailed between the guide-rib 76 and the guide-block 79, and said frame is provided with a channeled arm 83, which projects upwardly and outwardly through the opening 75 of plate 34, and also with an upwardly-projecting arm 84, recessed to form the shoulder 85 and the overhanging arm 86. Extending downwardly through the arm 86 is a set-screw 87, which impinges firmly upon the lever 88, connected pivotally at 89 to the vertically-adjustable plate 90, secured by bolt 91 to the inner side of the plate 34, between the guide-rib 76 and the flange 92, projecting inwardly from the front end of said plate 34. The opposite end of said lever is pivotally connected to the upper end of a pitman 93, mounted upon the crank-shaft 32.

The lower end of the sliding frame 82 is provided with an inclined recess 94, corresponding to the inclination of and communicating with the channel 95 of the arm 83 of said frame. The lower end of said frame is formed, preferably, of a plate 96, secured by screw-bolts 97 to the lower end of the frame 82 at opposite sides of the channel 95, which it bridges. Said plate is provided with a groove 98 in its under side, which extends longitudinally of the machine, and forward of said groove is provided with the horizontal shoulder 99.

100 designates the head of the upper barbing or bearding knife, and it is provided with a horizontal series of downwardly and inwardly disposed teeth 101, the lower edges of which occupy, normally, the plane of the shoulder 99 and are adapted, when advanced, to occupy a slightly lower plane. Said head fits slidingly into groove 94, formed in the lower end of the sliding frame and between the same and the plate 96 and is provided with a stem or shank 102, which occupies the channel of the arm 83 of said frame, and mounted in the end of said stem or shank is a set-screw 103, whereby the reciprocatory movement of said knife may be regulated.

In practice as the crank-shaft 32 revolves the lever 88 alternately rises and falls a distance sufficient to receive between the upper and lower (not yet described) barbing or bearding knives the cable hereinafter described and the nails hereinbefore referred to to be barbed.

Arranged vertically below the barbing or bearding knife just described is the companion or lower barbing or bearding knife. It comprises the head 104, provided with upwardly and inwardly projecting teeth 105 and with a stem or shank 106, extending downwardly and outwardly from its series of teeth. Said head rests upon the knife-carrier 107, which is bolted or otherwise rigidly secured to the plate 29 or bed-plate of the carrier and is provided with a channeled arm or extension 108, which projects downwardly and outwardly through the opening 75 of plate 34 and is occupied by the stem or shank 106 of the lower knife. The reciprocatory movement of said knife may be regulated also by means of a set-screw 109, mounted at its end, and it is held downward in proper position by means of the bridge-plate 110, secured by screw-bolts 111 to the frame 107. Said bridge-plate, which corresponds to the plate 96 of the upper frame, is provided with an opposing longitudinal groove 112 and shoulder 113, interposed between said groove and the teeth of the cutting-knife. The function of said grooves 98 and 112 and the shoulders 99 and 113 will be hereinafter described.

The reciprocatory knives are normally retracted by means of the spring 114, which bears at its opposite ends against the shoulders 115, projecting from said knives, and said spring finds its resistance or fulcrum point against the guide-bar 116, secured to and projecting outwardly from the plate 29. At its outer end the bar is bent to form the hook or stop arm 117 to limit the outward movement of the lever 118. Said lever is pivotally mounted at 119 in the arm 83 of the slide-frame 82 and bears against the adjustable set-screw 103 of the upper knife. A second lever 120 is pivotally mounted at 121 in the arm 108 of the knife-frame 107 and bears against the set-screw 109 of the lower knife. It also finds a bearing at its free end against the inner side of the lever 118, the arrangement being such that when said lever 118 is operated it causes the operation of the lever 120 and the forward and upper movement of both barbing and bearding knives, and when said lever 118 resumes its original position said knives are simultaneously retracted by means of the spring 114. Said knives in practice are advanced twice with each revolution of shaft 12, and in order to accomplish this we mount a collar 122 rigidly upon said shaft, provided with a pair of diametrically opposite arms 123, which successively engage the lower or free end of and operate the lever 118, said lever being limited as to its outward movement by the hook or stop arm 117 of bar 116.

Arranged in longitudinal alinement with the center of the space formed by and between the two grooves 98 and 112 and extending from a point adjacent to the front end of the carrier beyond the front end of the bed-frame is the twister-shaft 124, said shaft being journaled in bearings 125 at the upper ends of the standards 126, which are arranged at opposite sides of the push-and-pull rod 24, hereinbefore described. Said twister-shaft for the greater half of its length—that is, the rearward half—is diametrically increased slightly and is provided at diametrically opposite points with longitudinal grooves 127, which grooves are bridged at 128 at its journal-points in said bearings, and rearward of the rearmost bearing said grooves converge gradually inward to the apex of the sharpened or conical end of the shaft, as shown at 129, which end we shall hereinafter term the "mandrel" end, for a reason which will hereinafter appear. At the opposite or front end of the shaft is rigidly mounted a disk or collar 130, provided at diametrically opposite points with the apertures 131, through which extend the wires 132, which when twisted together form the flexible cable upon which the nails are strung. Said wires extend through said longitudinal grooves 127 and come together at the apex of said shaft. As the wear upon the shaft at this point is exceedingly severe, it is provided, preferably, with an extremely hard metal core 133, which may be removed at little expense and replaced when necessary by a new one.

The twister-shaft in operation makes several revolutions in one direction and then reverses said motion and makes an equal number of revolutions in the opposite direction, so as to alternately twist the wires forming the cable in opposite directions, and at the junction of said oppositely-twisted portions the nails hereinbefore referred to are secured and therefore prevent the untwisting or unraveling of said wires. The manner of securing said nails upon said cable at such points will be hereinafter described. Said shaft at a suitable point is provided with a small cog-wheel 134, which meshes continuously with a larger cog-wheel 135, mounted rigidly upon a short longitudinal shaft 136, journaled in bearings 137, and shaft 136 is provided with a small cog-wheel 138 and with a similar cog-wheel 139. The latter meshes continuously with and is driven by a cog-wheel 140 of the same diameter, mounted upon a short shaft 141, journaled in bearings 142 at the upper ends of the standards 143, bolted to the bed-frame. Said shaft occupies a lower horizontal plane than the shaft 136 and is provided also with a second and similar-sized cog-wheel 144, which cog-wheel is adapted to be engaged and operated at times by the mutilated spur-gear 145, mounted rigidly upon the shaft 12. A second mutilated spur-gear 146 is mounted upon said shaft 12 and is adapted to engage and operate the cog-wheel 138 when the engagement between cog-wheels 144 and 145 ceases. By this arrangement it is obvious that the continuously-rotating shaft 12, through the medium of the mutilated gear-wheels 145 and 146 and the gearing just described, causes the shaft 124 to make a number of revolutions in one direction and then reverse such movement, this operation being constantly repeated as long as the machine is in operation.

In order to twist or coil the reduced end of the nail-wire upon the cable, we employ the following elements—that is to say: 147 designates what will hereinafter be termed the "nail twisting or coiling sleeve," and it is mounted rotatably upon the mandrel end of the shaft 124 and is journaled in the bearing 148, bolted or otherwise secured to the plate 29 or the bed-plate 26, and in order to insure that said sleeve will reciprocate longitudinally upon said shaft when the carrier moves back and forth it is provided with annular flanges 149, which embrace the opposite sides of the bearing 148. At its front end said sleeve is formed with or rigidly carries a cog-wheel 150, which meshes continuously with the segment 151, mounted loosely upon the rear end of a stub-shaft 151$^a$, suitably journaled above the bed-frame. The hub of this segment is formed with a pair of arms 152 and 153, respectively. Said arms are adapted to be engaged once in each revolution of the shaft 12 by the two opposite sides of the tooth 154 of the collar 155, mounted rigidly upon said shaft 12, each of said sets comprising two teeth.

In practical operation as the nail twisting or coiling sleeve moves rearward with the carrier one set of teeth 154 engage the arms or teeth 153 and 152 successively and raise the segment 151, and consequently rotate said sleeve and twist the reduced end of the nail tightly upon the cable. Said twist is completed as the carrier begins its return movement, and at the same instant the segment, being relieved of engagement with said set of teeth 154, starts its descent. This movement, which would take place by gravity, is facilitated and insured by means of a retractile spring 156, attached at its lower end to the bed-frame or to an adjustable bracket 157, bolted thereto, (see Fig. 3,) and at its upper end to a chain or cable 158, said chain or cable being secured at its upper end to the hub of the segment and preferably in the groove of said hub, as shown clearly at 159 in Fig. 1. To limit the downward movement of said segment at the proper point, we employ, preferably, a cushion-stop 160, secured to the upper end of the bracket 157 and adapted to be engaged by one of the teeth 154 of the set, which has just passed from engagement with the teeth or arms of the segment-hub. As the wear and tear, however, would still be too great upon the nail twisting or coiling sleeve if the segment was permitted to descend its full distance without being checked, the collar 155 is provided with an arm 161 at its front end, which clears the narrow arm or tooth 152, but is adapted to be contacted by the wider arm or tooth 153 before the segment has completed its descent. The continued rotation of the shaft 12 then moves the arm 161 out of the way and permits the segment instantly to resume its depressed position and be ready for an immediate reëlevation by reason of the second set of teeth 154 coming in contact with the teeth or arms 153 and 152 to twist or coil the next nail upon the cable. Thus it will be seen that one complete revolution of the shaft 12 causes the twister-sleeve to make its operations in each direction, and at the same time the double cam 16 causes the carrier to make two complete reciprocations.

As will be observed by reference particularly to Fig. 2, the pinion 11, rotating continuously in the direction indicated by the arrow, tends, by reason of its engagement with the spur-gear 33, to move the carrier rearward at all times by a succession of jerks, and owing to the fact that there must be a certain amount of play between the actuating-cam 16 and the roller 17 of the crank-shaft 19 it is obvious that this tendency of the carrier to move by a series of jerks is not overcome. Consequently to counteract the effect of the engagement of said pinion with said wheel and to insure that the movement of the carrier shall be perfectly uniform and even and also to place all of the work of moving said carrier where it rightfully belongs—viz., upon the crank-shaft 19—the strong retractile spring 22, hereinbefore described, is employed, and it is obvious that the resistance of said spring to the rearward movement of the crank-arm is sufficient to accomplish such purposes. Said spring also assists the cam in sliding the carrier back to its advanced position.

Returning now to the nail twisting or coiling sleeve, it will be noticed that it is provided at its rear end with a centrally-perforated head 162, and said head, when the carrier occupies its advanced position, is adjacent to the pointed end of the shaft 124, as shown in Fig. 10. Said head for a distance of about one hundred and thirty degrees is thickened, such thick portion being provided at one side of the perforation of the head with a straight groove 163 and an alined passage 164 and is gradually tapered or beveled down to the plane of the natural face of the head, the junction of such beveled portion with said natural face of the head taking place at the opposite side of the perforation from said groove and passage and extending preferably at about a right angle to them, as shown at 165. When the segment 151 is depressed and the horizontal sleeve consequently arranged to receive the reduced end of the nail-wire, said groove and passage are arranged in alinement with the rectangular passage formed by and between the notches of the knives hereinbefore described and with the hole or passage 75 in the stand-plate 35, as shown most clearly in Figs. 2 and 26.

166 designates a plate secured upon plate 29 and provided with a pair of arms 167 and 168, in which the transversely-extending rock-shaft 169 is journaled. Said shaft at its inner end is provided with a downwardly-disposed hook or forked arm 170, which is arranged in longitudinal alinement with the perforation of the head of the twisting or coiling sleeve, against which said hook nearly lies. Said shaft in order to maintain said hook in vertical pendent position (shown clearly in Fig. 7) is provided with an actuating-spring 171, which is coiled around the shaft and engages at its opposite ends the arm 167 and a pin 172, projecting from said shaft. In order to prevent said spring from forcing said hook beyond such vertical plane and against the head of said sleeve, a lug 173 projects from the shaft and bears against the shoulder 174 of said bearing-arm 167.

In practical operation after each nail is secured upon the cable and the latter moves rearward said nail bears against said hook and, overcoming the resistance of the spring 171, rotates said shaft until it passes from engagement with said hook. Immediately this takes place the spring returns said hook to its normal position without interfering with the movement of the cable, which it straddles, as shown clearly in Fig. 7. In order that said nails may be coiled around the cable-wire, they must first be caused to intersect the latter, and to accomplish this we have provided the mechanism about to be described.

175 designates a plate or extension which is bolted or otherwise rigidly secured upon the bed-plate or one of the plates secured thereto, and said plate extends laterally from the side of the machine occupied by the plate 35 at an angle corresponding to that of the cutting edges of the knives, and mounted upon said plate at intervals are two or more bearing-boxes 176 and one or more guide-bearings 177 for the nail-forming wire 178, mounted upon a reel or equivalent device (not shown) and extending between the straightening or guide rollers 179. Inward of said guide-bearing 177 is an adjustable bearing-block 180, against which the dog 181 is actuated by the spring 182 to force the wire, the object of said dog being to overcome the momentum acquired by and to check the movement of said wire due to the rotation of the reel, hereinbefore referred to, upon which the supply of wire is coiled in practice. Said wire also extends through the hollow sliding bolt 183, mounted in the bearing-boxes 176. Said bolt at a suitable point is formed with a rectangular enlargement 184, provided with a depending arm 185, extending through the slot 186 in the plate 175. A guide-rod 187, secured rigidly to a depending lug 188 of said plate, extends through said arm 185, and spirally surrounding said rod, bearing at its opposite end against said lug and said arm, is an expansive spring 189, which is adapted at intervals to force said bolt forward a sufficient distance to project the reduced extension of the nail-wire into the passage 164 of the wire twisting or coiling sleeve 147, as shown clearly in Fig. 11. In order that said wire shall be positively and reliably advanced with each forward movement or shoot of the bolt, the enlargement of the latter is recessed sufficiently to form a shoulder 190, against which the wire bears and is held by the spring-actuated dog 191, pivotally mounted upon said enlargement. The spring 192, engaging said dog, is attached at its opposite end to the hook or arm 193, projecting also from said enlargement. This dog, by impinging firmly against said wire, prevents it from slipping and consequently insures its advance with each corresponding movement on the part of the bolt. To retract said bolt after each advance, the collar 194 is mounted rigidly upon the longitudinal shaft 195, journaled in bearings supported by the bed-frame, and owing to the fact that said wire-feeding mechanism moves back and forth with the carrier said collar is made of length to accommodate such movement and is provided at diametrically opposite points with the arms 196 in order that the bolt may be retracted twice in each revolution of the shaft 195. Said shaft is provided with a beveled gear 197, which meshes with a small gear 198 upon the transverse shaft 199, journaled in bearings supported by the bed-frame, and said shaft at its opposite end carries the beveled gear 200, which meshes continuously with and is driven by the similar gear 201 upon shaft 12.

By the employment of the dogs 177 and 191, arranged as described, it is obvious that the latter may grasp the wire and feed it forward with each corresponding movement of the bolt without any material opposition on the part of the former, but at the same time said dog 181, after the wire has been fed forward the requisite distance, checks the tendency toward further movement of the same due to the momentum acquired by the rotation of the reel, and consequently prevents any buckling or bending of the wire between said dog and the point where it enters the bolt, and it is equally obvious that upon the withdrawal of the bolt after each advance movement said dog 181 by impinging firmly against the wire counteracts any tendency toward backward movement of the same which it might acquire through the frictional contact with the dog 191 as it moves back with the bolt.

From the foregoing, taken in connection with the accompanying illustrations, it will be obvious that the nail-wire is fed forward so as to intersect the cable an instant before the carrier slides rearward, and that as the sleeve 147 twists the diminished end of the nail-wire tightly around the cable the reciprocating knife 51 advances and in conjunction with the stationary knife synchronously splits from the body of the wire and severs from the advanced portion thereof a piece of wire corresponding in form to the cutting edge of the knife 51, the ends of said portion being beveled to correspond with the cutting edges 61 and 62 of said knife, and owing to the fact that the vertical distance between the upper and lower ends of the cutting edge 62 is equal to the thickness of the wire the advanced portion is severed so as to complete the formation of and sharpen the lower end of a nail. At the same time of course that the said portion is split from the body of the wire the advanced end of the latter is reduced in thickness for a distance equal to the length of the cutting edge 60, as will also be clearly understood by referring to Fig. 24.

At the same time that the above-mentioned operations are taking place the nail next in advance of that which is being coiled or twisted upon the cable has reached a point opposite the middle of the barbing-knives 100 and 104, the cable-wire being prevented from sagging for the length of the carrier by the guide-plate 202, secured by screw-bolts 203 to the inner side of the plate 34, as shown clearly in Fig. 10. Immediately said advanced nail has assumed its proper position between said knives, with its head (represented by the coiled end) and the longitudinally extended cable occupying the passage formed by the opposing grooves 98 and 112, the crank-shaft 32 causes the lever 88 to move downwardly and cause a slight movement of the slide-frame 82, so that the upper knife 100 will impinge tightly upon the nail, as shown clearly in Fig. 8, in order that the opposing shoulders 99 and 113 shall engage the shank of the nail adjacent to its head and bend it sufficiently to dispose its longitudinal axis in the same plane as the axis of the cable-wire, and at the same time the coiled head is pressed tightly between the grooved surfaces of said knives and elongated slightly, so that it will be impossible for the nail to turn upon the cable, or, in other words, to fix the relation between each nail and the cable so that all of the nails shall project rigidly in the same direction from the cable. An instant after the clamping operation has taken place one of the arms 123 of the collar 122 engages the lever 118 and forces it to the position indicated in Fig. 8. This operation of course advances simultaneously the knives 100 and 104 against the upper and lower sides of the shank of the nail and thereby barbs or roughens the same, so that it would be practically impossible for the nail to work loose accidentally after once being driven home in the box or other receptacle.

The means hereinbefore described for twisting the wires 132 to form the cable are timed with respect to the operation of the nail-twisting sleeve, so that as soon as the coiling of the reduced end of the nail upon the cable is completed (and is consequently withdrawn from the passage 164 in order that it may be simultaneously freed from engagement with the twisted sleeve by the continued movement of the cable to the rear and the opposite or forward movement of said sleeve with the carrier and its simultaneous back rotation, which disengages the shank of the nail from the groove 163) it begins to twist the wire from said nail in the opposite direction to its twist at the opposite side of said nail, and such twisting movement continues until the carrier has reached the limit of its advance movement and a second nail is shot by the bolt 183 into engagement with the twisting-sleeve and is coiled by the latter upon the cable, and at the same time the nail in advance has assumed a position between the barbing-knives and the carrier begins again its rearward movement and slides the sleeve 147 rearwardly upon the mandrel end of the shaft 124, which at this instant has again reversed its rotatable operation and twists the wire within said sleeve and in advance of the last nail secured on the cable, the length of said twisted portion being determined, of course, by the distance between said twisted nail and the pointed end of said shaft. The carrier then moves forward again and the next nail advanced by the bolt 183 is coiled upon the cable adjacent to the point of said mandrel end of the shaft and at the junction of said twisted and untwisted portions of the wires, as shown clearly in Fig. 10. All succeeding operations are repetitions of those described.

In order to feed the cable continuously and with a positive and uniform movement through the machine, we employ the following elements—that is to say, 204 designates a short transverse shaft which is interposed between the carrier and the shaft 199 and is journaled in bearings 205 upon the bed-frame, and 206 is a similar and parallel shaft which is journaled in bearings 207 near the rear end of said bed-frame. Mounted rigidly upon said shaft are the sprocket-wheels 208, each provided, preferably, with four sets of teeth, two in a set, said sets being disposed so as to leave a blank or toothless space between each set exceeding the length of one link of the endless chain 209 connecting said sprocket-wheels and extending longitudinally of the machine, with its upper portion slightly below the axis of the cable, and mounted rigidly upon or cast integral with certain of said links (in this instance every fourth link) are the bifurcated boxes 210, and rigidly mounted within the bifurcations of said boxes upon the transversely-extending pins 211, journaled rotatably in said boxes, are the forked arms 212, which are adapted successively as they rise in the direction indicated by the arrow, Fig. 2, to straddle the cable and come into engagement with one of its nails at its front side, so as to apply a positive and reliable pressure against them and insure by such force feed that the cable shall move through the twisting-shaft 124 at a uniform rate of speed. As it is necessary, however, that such hook-arms shall positively and reliably be freed or disengaged from the nails and cable when they start on their downward course around the rear sprocket-wheel 208, which could not be reliably accomplished if they projected always at right angles from the chain, we mount rigidly upon the extended ends of the pins 211 the weights 213, in the shape of elongated arms extending at about right angles to their respective hook-arms, each of which arms by gravity just before reaching the upper side of the forward sprocket-wheel 208 assumes a vertical position, so as to hold its corresponding fork-arm projecting rearwardly and preferably inclined slightly downward toward its free end. Just at the moment it assumes this position the fork-arm is adjacent to the lower side of the cable and below one of the nails projecting laterally therefrom, and at substantially the same instant the pendent weight comes in contact with the beveled guide-arm 214, projecting forwardly from the under side of the horizontally-slotted guide-frame 215 and extending longitudinally of the machine and supported upon the vertical standard 216, mounted upon the bed-plate. By this arrangement it is obvious that as soon as said weight comes in contact with the stationary guide 213 the continued movement of the chain causes it to pivotally operate until it has assumed a horizontal position and its corresponding forked arm has straddled the cable and the guide-bar 217 (carried by brackets 218 of frame 215) from below and contacted with the front side of the rearwardly-moving nail, and this relation is maintained until the fork-arm nearly reaches the rear end of the machine, owing to the fact that said weight passes from said guide-arm into the horizontal grooved frame 214, from which it emerges adjacent to the rearmost sprocket-wheel, and at the moment of such disengagement by gravity it again assumes a vertically-pendent position and pivotally operates its corresponding fork-arm downwardly and therefore out of engagement with the cable and said nail. This performance takes place continuously as long as the machine is in operation, and by reason of the fact that the guide-frame 214 is of greater length than the distance between two of the nails on the cable or two of said fork-arms it is obvious that said cable is moved at all times by a positively-applied pressure, so that no slipping or buckling can take place. Lateral movement is also prevented by reason of the engagement of the fork-arms with the said longitudinal guide-bar 217. In order to drive said chain at corresponding speed, we mount upon one end of the shaft 204 the spur-gear 218, which meshes continuously with and is driven by the gear-pinion 218 upon the shaft 199, as shown clearly in Fig. 1.

From the above description it will be apparent that we have produced a machine for manufacturing flexible metallic box-straps which is positive and reliable in operation and which, as has been demonstrated, is capable of turning out about fifty feet of said strap per minute, which may be cut in pieces of any desired length by hand or by an automatically-operating knife. The wire which forms the cable extends through the disk 130 from a suitable reel, which need not be illustrated or described in this connection. It is to be understood, of course, that we reserve the right to make all such changes in the form, detailed construction, or organization of parts, and reserve the right to the use of all mechanical equivalents which properly fall within the spirit and scope of our invention.

Having thus described the invention, what we claim as new, and desire to secure by Letters Patent, is—

1. In a box-strap machine, the combination with a suitable framework, of an oscillatory wire-twisting shaft therein provided with passages through which the wire extends, a periodically-advanced bolt arranged at an angle to said shaft, means to advance a wire with each advance of said bolt and cause it to intersect the first-named wires at their under side, means to twist or coil said wire tightly upon the first-named wires, and to sever said wire at a point between the front end of said bolt and the first-named wire, substantially as described.

2. In a box-strap machine, the combination with a wire-twisting shaft provided with grooves or passages for the wire, and a mechanism for periodically projecting the end of a second wire across the path and just below the wire of said twisting-shaft, of means for twisting or coiling said projecting end of the latter wire upon the former, means for severing such twisted or coiled end from the body of the wire and means for reversing the direction of rotation of said twisting-shaft each time the intersecting wire coils upon the first-named or cable wire, substantially as described.

3. In a box-strap machine, the combination with a wire-twisting shaft provided with grooves or passages for the wire, and a mechanism for periodically projecting the end of a second wire across the path and just below the wire of said twisting-shaft, of means for twisting or coiling said projecting end of the latter wire upon the former, means for severing such twisted or coiled end from the body of said wire, means for reversing the direction of rotation of said twisting-shaft each time the intersecting wire coils upon the first-named or cable wire, and a reciprocatory carrier for advancing the mechanism for feeding and coiling the last-named wire, substantially as described.

4. In a box-strap machine, the combination with a suitable framework, a grooved wire-twisting shaft therein, and means for operating said shaft first in one direction and then reversing such movement, of mechanism for twisting or coiling a stiff wire upon the cable formed by the wires of the twisting-shaft at its period of rest—that is, at the moment it ceases to rotate in one direction and begins to rotate in the opposite direction, substantially as described.

5. In a box-strap machine, the combination with a suitable framework, a grooved wire-twisting shaft therein, and means for operating said shaft first in one direction and then reversing such movement, of mechanism for twisting or coiling a stiff wire upon the cable formed by the wires of the twisting-shaft at its period of rest—that is, at the moment it ceases to operate in one direction and begins to operate in the opposite direction—and means for severing the twisted or coiled end of said wire from its body portion, substantially as described.

6. In a box-strap machine, the combination with a suitable framework, a grooved wire-twisting shaft therein, and means for operating said shaft first in one direction and then reversing such movement, of mechanism for twisting or coiling a stiff wire upon the cable formed by the wires of the twisting-shaft at its period of rest—that is, at the moment it ceases to rotate in one direction and begins to rotate in the opposite direction—and means for splitting said wire for a suitable distance and severing it from its body portion, so as to leave the latter with a reduced extension, and the twisted portion with a pointed or sharpened shank, substantially as set forth.

7. In a box-strap machine, the combination with a suitable framework, a grooved wire-twisting shaft therein, and means for operating said shaft first in one direction and then reversing such movement, of mechanism for twisting or coiling a stiff wire upon the cable formed by the wires of the twisting-shaft at its period of rest—that is, at the moment it ceases to rotate in one direction and begins to rotate in the opposite direction—means for splitting said wire for a suitable distance and severing it from its body portion, so as to leave the latter with a reduced extension and the twisted portion with a pointed or sharpened shank, means for feeding the cable longitudinally with the nail twisted thereon, and barbing-knives to engage said nail and serrate or roughen its sides, substantially as and for the purpose set forth.

8. In a box-strap machine, the combination with a suitable framework, a grooved wire-twisting shaft therein, and means for operating said shaft first in one direction and then reversing such movement, of mechanism for twisting or coiling a stiff wire upon the cable formed by the wires of the twisting-shaft at its period of rest—that is, at the moment it ceases to rotate in one direction and begins to rotate in the opposite direction—means for splitting said wire for a suitable distance and severing it from its body portion, so as to leave the latter with a reduced extension and the twisted portion with a sharpened or pointed shank, means for feeding the cable longitudinally with the nail twisted thereon, and means for slightly elongating the coil or head of said nail to make it rigid relative to the cable, substantially as described.

9. In a box-strap machine, the combination with a suitable framework, a grooved wire-twisting shaft therein, and means for operating said shaft first in one direction and then reversing such movement, of mechanism for twisting or coiling a stiff wire upon the cable formed by the wires of the twisting-shaft at its period of rest—that is, at the moment it ceases to rotate in one direction and begins to rotate in the opposite direction—means for splitting said wire for a suitable distance and severing it from its body portion, so as to leave the latter with a reduced extension and the twisted portion with a sharpened or pointed shank, means for feeding the cable longitudinally with the nail twisted thereon, means for slightly elongating the coil or head of said nail to make it rigid relative to the cable, and barbing-knives to engage the shank of said nail and serrate or roughen its sides, substantially as described.

10. In a box-strap machine, the combination with a suitable framework, a grooved wire-twisting shaft therein, and means for operating said shaft first in one direction and then reversing such movement, of mechanism for twisting or coiling a stiff wire upon the cable formed by the wires of the twisting-shaft at its period of rest—that is, at the moment it ceases to rotate in one direction and begins to rotate in the opposite direction—means for splitting said wire for a suitable distance and severing it from its body portion, so as to leave the latter with a reduced extension and the twisted portion with a sharpened or pointed shank, means for feeding the cable longitudinally with the nail twisted thereon, means for slightly elongating the coil or head of said nail to make it rigid relative to the cable, barbing-knives to engage the shank of said nail and serrate or roughen its sides, levers to advance said barbing-knives, means to periodically operate them, and means to cause their automatic disengagement from the nail-shanks, substantially as described.

11. In a box-strap machine, the combination of a suitable framework, and mechanism for advancing a cable-wire longitudinally thereof, and for coiling upon said cable-wire at intervals laterally-projecting nails, with a frame upon said framework, a vertically-sliding frame above that first named, and means each time a nail assumes a position above said first-named frame to cause the last-named frame to move downward and clamp tightly and thereby elongate the coil or head of said nail between said clamping-frames, substantially as described.

12. In a box-strap machine, the combination with a suitable framework, and mechanism for advancing a cable-wire longitudinally thereof, and for coiling upon said cable-wire at intervals laterally-projecting nails, of a longitudinally-grooved frame upon said framework, a barbing-knife mounted to slide therein, a superposed grooved frame, a barbing-knife superposed with relation to the first-named knife and carried by the superposed frame, and means to cause first the descent of said superposed frame, that it may clamp the head of the nail tightly between said grooves, and then the advance of said knives upon the shank of said nail, substantially as described.

13. In a box-strap machine, the combination with a suitable framework, mechanism for feeding a cable longitudinally thereon, and mechanism for forming nails and securing them tightly upon said cable at regular intervals, a frame carrying a sliding barbing-knife, a vertically-sliding frame above the same and carrying a barbing-knife which converges toward the other, a lever engaging said vertically-sliding frame, and a crank-shaft connected to said lever and adapted to raise and lower said frame and its knife, substantially as and for the purpose described.

14. In a box-strap machine, the combination with a suitable framework, mechanism for feeding the cable longitudinally thereof, and mechanism for forming and securing nails tightly upon said cable at intervals, of a spring-actuated shaft provided with a fork embracing said cable in advance of each nail as it is formed, substantially as described.

15. In a box-strap machine, the combination with a suitable framework, a wire-twisting shaft journaled longitudinally therein, and provided with longitudinal grooves which converge to a point at the front end of said shaft, of a sleeve journaled upon the end of said shaft, and closed at one end and provided with a transverse passage or groove, which normally extends transversely of and below the cable, mechanism for projecting a stiff wire through said groove or passage below the cable, and means for rotating said sleeve and thereby twisting the end of said wire which projects beyond said cable tightly upon the latter, substantially as described.

16. In a box-strap machine, the combination with a suitable framework, a wire-twisting shaft journaled longitudinally therein and provided with longitudinal grooves which converge to a point at the front end of said shaft, of a sleeve journaled at the end of said shaft, and closed at one end and provided with a transverse passage or groove which normally extends transversely of and below the cable, mechanism for projecting a stiff wire through said groove or passage below the cable, means for rotating said sleeve and thereby twisting the end of said wire which projects beyond said cable tightly upon the latter, and a sliding knife for splitting said wire outward of said coiled or twisted end so as to produce simultaneously a sharpened nail and a reduced extension of the body of the wire, substantially as described.

17. In a box-strap machine, the combination with a suitable framework, a wire-twisting shaft journaled longitudinally therein, and provided with longitudinal grooves which converge to a point at the front end of said shaft, of a sleeve journaled at the end of said shaft, and closed at one end and provided with a transverse passage or groove which normally extends transversely of and below the cable, mechanism for projecting a stiff wire through said groove or passage below the cable, means for rotating said sleeve and thereby twisting the end of said wire which projects beyond said cable tightly upon the latter, a sliding knife for splitting said wire outward of said coiled or twisted end so as to produce simultaneously a sharpened nail and a reduced extension of the body of the wire, a sliding carrier carrying said rotary sleeve and the mechanism for feeding and splitting said wire, and mechanism for advancing said carrier as the actions described take place, and then for returning said carrier and consequently said sleeve and their mechanism to its original position, substantially as described.

18. In a box-strap machine, the combination with a suitable framework, and a rotating wire-twisting shaft journaled therein, and provided with longitudinal grooves and a pointed end to which said grooves converge, and means for feeding wires longitudinally through said shaft, of a wire-twisting sleeve rotatably mounted on said shaft and provided with a cog-pinion, a toothed segment engaging said pinion, and means for operating said toothed segment at intervals so as to rotate said sleeve and twist or coil a wire upon said cable, substantially as described.

19. In a box-strap machine, the combination with a suitable framework, and a rotating wire-twisting shaft journaled therein, and provided with longitudinal grooves and a pointed end to which said grooves converge, and means for feeding wires longitudinally through said shaft, of a wire-twisting sleeve rotatably mounted on said shaft and provided with a cog-pinion, a toothed segment engaging said pinion, means for operating said toothed segment at intervals so as to rotate said sleeve and twist or coil a wire upon said cable, and means for facilitating and making positive the opposite movement of said segment and thereby the backward rotation of said sleeve after it is disengaged from said wire, substantially as described.

20. In a box-strap machine, the combination with a suitable framework, and a rotating wire-twisting shaft journaled therein and provided with longitudinal grooves and a pointed end to which said grooves converge, and means for feeding wires longitudinally through said shaft, of a wire-twisting sleeve rotatably mounted on said shaft and provided with a cog-pinion, a toothed segment engaging said cog-pinion and provided at its opposite side with teeth, and a rotating collar provided with two sets of teeth, which are adapted successively to engage the last-mentioned teeth of said segment and thereby raise the same and rotate the sleeve, substantially as described.

21. In a box-strap machine, the combination with a suitable framework, a rotating wire-twisting shaft journaled therein and provided with longitudinal grooves and a pointed end to which said grooves converge, and means for feeding wires longitudinally through said shaft, of a wire-twisting sleeve rotatably mounted on said shaft, and provided with a cog-pinion, a toothed segment engaging said cog-pinion and provided at its opposite side with teeth, a rotating collar provided with two sets of teeth which are adapted successively to engage the last-mentioned teeth of said segment and thereby raise the same and rotate the sleeve, a flexible connection attached to the hub of said segment, and a retractile spring connected thereto and to a fixed point of the framework, and adapted to depress the segment after each elevation so as to return the sleeve to its original position, substantially as described.

22. In a box-strap machine, the combination with a suitable framework, a sliding carrier mounted therein, a rock-shaft pivotally connected to said carrier, and a cam to operate said rock-shaft, of a crank-shaft journaled in said carrier and provided with a cog-wheel, a rotary transverse shaft, a cog-pinion upon the same and engaging the cog-wheel of said crank-shaft at its under side, a reciprocating knife guided in said carrier and linked to said crank-shaft, a hollow bolt suitably supported by said carrier and extending transversely, wire-gripping devices carried by said bolt, a cam engaging an arm depending from said bolt and adapted to advance the same at intervals, and thereby project a wire beyond said knife that the latter may split and sever the projecting from the body portion, and means to retract said bolt after each splitting operation and slide it back loosely upon said wire, substantially as described.

23. In a box-strap machine, the combination with a suitable framework, a sliding carrier mounted therein, a rock-shaft pivotally connected to said carrier, and a cam to operate said rock-shaft, of a crank-shaft journaled in said carrier and provided with a cog-wheel, a rotary transverse shaft, a cog-pinion upon the same and engaging the cog-wheel of the crank-shaft at its under side, a reciprocating knife in said carrier and linked to said crank-shaft, a hollow bolt suitably supported by said carrier and extending transversely, wire-gripping devices carried by said bolt, a cam engaging an arm depending from said bolt and adapted to advance the same at intervals, and thereby project a wire beyond said knife that the latter may split and sever the projecting from the body portion, means to retract said bolt after each splitting operation and slide it back loosely upon said wire, and means to hold the wire so that the withdrawal of the bolt does not affect its position, substantially as described.

24. In a box-strap machine, the combination with a suitable framework, of a stationary knife channeled or grooved at its cutting end, and a reciprocatory knife provided with an opposing channel or groove which with the former provides a transverse passage through which a nail-forming wire extends and is guided, and means to advance said reciprocatory knife and split said wire longitudinally and sever a portion from its end, substantially as described.

25. In a box-strap machine, the combination with a suitable framework, and a stationary knife mounted therein and provided with a groove or channel at its front or cutting end, and with a V-shaped notch in its cutting edge, of an upper and reciprocatory knife which is provided with an opposing channel or groove which with the other forms a transverse guide-passage for a nail-forming wire, and provided also with a depending V-shaped cutting edge adapted to register with the notch of the first-named knife, and means to advance said last-named knife and thereby split the wire longitudinally and sever it at an angle at a point coincident with said V-shaped cutting edges of said knives, substantially as described.

26. In a box-strap machine, the combination with a suitable framework, and an adjustable knife mounted therein and provided with a channel or groove at its front or cutting end and with a V-shaped notch in its cutting edge, of an upper and reciprocatory knife adjustable as to length, which is provided with an opposing channel or groove which with the other forms a transverse guide-passage for a nail-forming wire, and provided also with a depending V-shaped cutting edge adapted to register with the notch of the first-named knife, and means to advance said last-named knife and thereby split the wire longitudinally and sever it at an angle at a point coincident with said V-shaped cutting edges of said knives, substantially as described.

27. In a box-strap machine, the combination with a suitable framework, a pair of rotating shafts, a cam-wheel upon one and a cog-pinion upon the other, a reciprocatory carrier mounted upon the framework and provided with a crank-shaft, a cog-wheel thereon engaging said pinion, a rock-shaft linked to said carrier, a spring connected to said rock-shaft and a fixed part of the framework and tending normally to resist the advance movement of the carrier, and a crank-arm upon said rock-shaft engaged by said cam-lever, whereby the resistance of said spring is overcome, a stationary knife mounted upon said carrier, and a reciprocatory knife suitably guided upon said carrier and linked to the crank-shaft, substantially as described.

28. In a box-strap machine, the combination with a stationary frame provided with a groove and a shoulder, which shoulder projects to a plane above the base of the groove, a vertically-sliding frame provided with an opposing superposed groove and with an opposing superposed shoulder, the face of said shoulder occupying a plane below the base of said groove, and means to force said sliding frame downwardly and clamp coiled nail-heads tightly between them, and by pressure of said shoulders to dispose the shanks of said nails in longitudinal alinement with the cable upon which said nail-heads are coiled or twisted, substantially as described.

29. In a box-strap machine, the combination with mechanism for coiling nails upon a moving cable, of an endless chain suitably guided and driven, bearing-blocks rigid with relation to said chain, shafts journaled loosely therein and provided with forked arms which straddle or embrace the cable from below in rear of the nails secured thereon, substantially as described.

30. In a box-strap machine, the combination with mechanism for coiling nails upon a moving cable, of an endless chain suitably guided and driven, bearing-blocks rigid with relation to said chain, shafts loosely mounted thereon and provided with forked arms which straddle or embrace the cable from below in rear of the nails secured thereon, and with weights which are adapted at the discharge end of the machine to assume a pendent position and disconnect said forked arms from said cable, substantially as described.

31. In a box-strap machine, the combination with a suitable framework, means for securing nails at intervals upon a longitudinally extending and moving cable, and a grooved guideway suitably supported from said machine, of an endless chain suitably guided, bearing-blocks mounted at intervals thereon, shafts journaled therein, and provided with forked arms which straddle or embrace from below the superposed cables in rear of the nails secured thereon, and weighted arms secured upon the ends of said shaft and successively passing through said guideway and thereby holding said forked arms in engagement with the cable and the nails, substantially as described.

32. In a box-strap machine, the combination with a suitable framework, means for securing nails at intervals upon a longitudinally extending and moving cable, and a grooved guideway suitably supported from said machine, of an endless chain suitably guided, bearing-blocks mounted at intervals thereon, shafts journaled therein, a weight at one end of each shaft, a forked arm projecting in the middle of said shafts at an angle to said weights, and a beveled guide-plate secured to said guideway and adapted by contact with each weight to successively cause them to assume a horizontal position, and the forked arms of their respective shafts to assume a vertical position and embrace the cable in rear of the nails thereon, substantially as described.

33. In a box-strap machine, the combination with a suitable framework, means for securing nails at intervals upon a longitudinally extending and moving cable, and a grooved guideway suitably supported from said machine, of an endless chain suitably guided, bearing-blocks mounted at intervals thereon, shafts journaled therein, a weight at one end of each shaft, a forked arm projecting in the middle of each shaft at an angle to said weights, a beveled guide-plate secured to said guideway and adapted by contact with each weight to successively cause them to assume a vertical position and embrace the cable in rear of the nails thereon, and a longitudinal guide-plate supported from said guideway and embraced at its lower edge by the upwardly-projecting forked arms, substantially as described.

In testimony whereof we affix our signatures in presence of two witnesses.

JULIUS J. WOLF.
NOBLE G. ROSS.

Witnesses:
M. R. REMLEY,
G. Y. THORPE.